March 21, 1939.                 J. B. EISEN                 2,151,019
BOTTLE CLOSURE
Filed Aug. 24, 1934
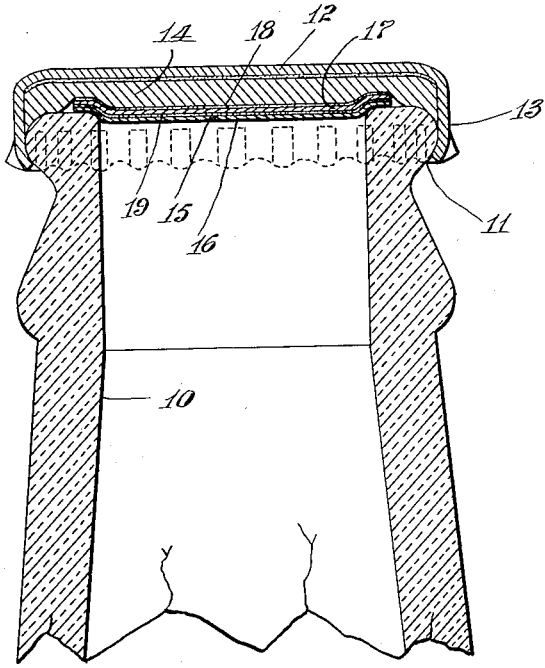
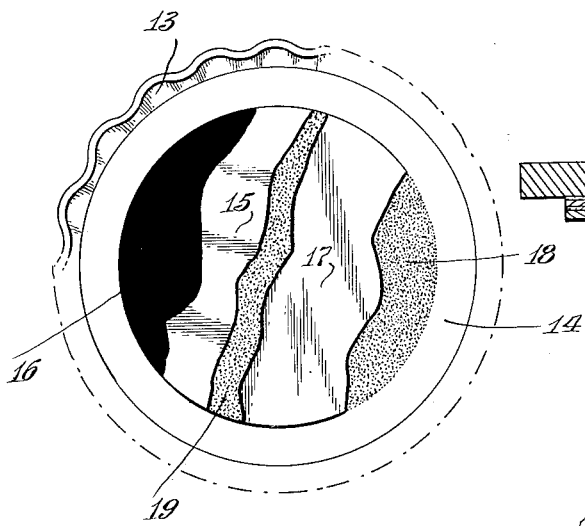
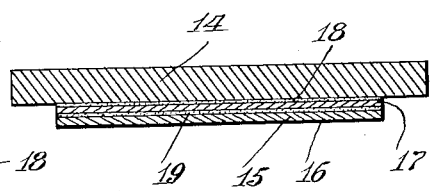
Jay Bernard Eisen
INVENTOR
BY
ATTORNEY Patented Mar. 21, 1939

2,151,019

UNITED STATES PATENT OFFICE 2,151,019

BOTTLE CLOSURE

Jay Bernard Eisen, Yonkers, N. Y., assignor to Ferdinand Gutmann & Co., Brooklyn, N. Y., a corporation of New York Application August 24, 1934, Serial No. 741,239

2 Claims. (Cl. 215—37)

The invention relates to bottom closures, and more particularly to bottle closures of the so-called crown type in which the central portion of the cushion disk is protected by a facing preventing contact of the contents of the bottle with the material of the cushion disk of the cap.

Closures of the type to which the invention relates have long been used. Different materials have been used for the facing disk or "spot" according to the beverages being packaged, and such facing disks have been secured in position upon the cushion disk in different ways. Originally, the central portion of the cushion disk was protected by metal foil held in position by forcing the edge of the foil into slots formed in the material of the cushion disk, a practice which is still followed in the production of caps for certain uses. Various cements or adhesives have also been used, which in some instances, have been selected because they supplemented the material of the facing disk in preventing seepage of gases from the container through the facing disk and the cushion disk, while in other instances, the cements used have been selected because of their peculiar affinity for the material of the facing disk. With different manufacturing methods, it has been found desirable to select adhesives which adapt themselves to the particular method employed either in the production of the strip material from which the facing disks are cut when applying them to the cushion disk of the cap, or in forming the bond between said facing disk and the cushion disks.

The material for forming the facing disks prior to my invention was selected solely with regard to its capability of resisting deterioration due to contact of the contents of the container therewith, and the cements used in bonding the facing disk to the cushion disk were selected with regard to their efficiency in relation to the material of the facing disk, and manufacturing methods in assembling the cap were adapted to the conditions imposed by the material of the disk and the adhesive used.

In the production of closures for use in the bottling of beer and other malt beverages, the facing disk ordinarily used is of aluminum foil. In the bottling of natural or artificial mineral waters, the facing disk is ordinarily made of a tin or an aluminum foil. In the bottling of ginger ale and other so-called soft drinks, a fairly heavy express or kraft paper having a varnished surface is extensively used, since the metal foils have not been found to be chemically resistant to the ingredients of some soft drinks.

Metal foils have been applied to the cushion disk without the aid of adhesives and with various different kinds of adhesives. With varnished paper facing disks, gutta-percha has been extensively used. In some instances, a strip of gutta-percha was associated with a strip of facing material during the application of the facing disk to the cushion disk within a metal shell, while in other instances, the gutta-percha was applied to the strip of facing material prior to its accumulation in a roll so that as the strip was fed in the machine used for applying the facing disk to the cushion disk of the cap, a single feeding mechanism was required.

In applying the facing disk to the cushion disk, heat and pressure are required as in most gluing operations, in order to secure the desired intimate contact of the two parts to be bonded together and a proper conditioning of the cement. When metal foils are used, the material of the facing disk permits the rapid conductivity of heat to the stratum of cement between the facing disk and the cushion disk. When varnished kraft or express paper is used, the conduction of heat to the adhesive is delayed sufficiently to limit the speed of production of the caps, to compensate for which an adhesive having a low fusing point, is used. In some assembling methods, in order to ensure the adhesive being subjected to heat in a manner to permit an increased speed in the assembly operation, the cushion disk is heated prior to the application of the facing disk thereto, thus overcoming in large measure, the difficulties arising from the necessity for applying heat to the adhesive through the facing disk.

The material of the facing disks will vary from .001 to .006 of an inch, the metal foil being relatively much thinner than the varnished paper, which latter when used as a facing material for crown caps, is relatively thicker than the varnished paper used in the packaging of foodstuffs in which the factor of high pressure within the container is absent.

With the above conditions in mind, I have provided a closure of the crown type embodying therein a laminated facing disk, one of the laminae of which is chemically resistant to the contents of the container, and the other lamina of which is impermeable by gasses within the container. By the use of superimposed laminae bonded together before the disk is cut from a strip thereof, seepage of the contents of a container whether liquid or gaseous, is prevented and deterioration of the material of the facing disk from contact with the contents of a container is prevented. A closure embodying the invention is, therefore, capable of a wide range of uses, thus obviating the necessity for the selection of a particular facing material to adapt the closure for use with the packaging of different materials. One of the laminae is a metal foil, and since the maximum thickness of the laminated structure is well within the .006 of an inch, the conduction of heat to the cementing medium can be sufficiently rapid to place no substantial limitation upon the speed at which the finished caps may be produced.

With this form of facing material, the adhesive used in bonding the two laminae together or in bonding the laminated strip to the cushion disk has no purpose beyond the formation of an adequate bond, that is to say, the adhesive is not used as a retardant for confining the liquid or gases within a container or for protecting the material of the cushion disk from deterioration because of the seepage of the liquid or gas of the beverage being packaged through the facing disk. The adhesive used is therefore immaterial aside from its efficiency as a bonding medium.

In a closure or bottle cap embodying the invention, the lamina exposed within the mouth of a container is chemically resistant to such contents and serves to protect the other or inner lamina from chemical action thereon. When using thin material, there may be a small measure of porosity. Whether this material be paper or metal foil, the pores are so minute as to preclude the passage of a liquid therethrough. Gases, particularly when under fairly high pressure as in soft drinks, tend to escape through these pores. The inner lamina, however, being impermeable to such gases except where minute voids are developed in the production of the material of this lamina, will confine such gases or vapors and thus prevent the development of "leakers" as a result of the escape of gas between the facing disk and the cushion disk. While there is a remote possibility that the pores in the outer lamina of the facing disk may coincide or register with voids in the inner lamina, the probability of this condition is so remote as to be negligible.

The invention consists primarily in a bottle closure embodying therein a shell having a skirt so formed as to cooperate with means upon the neck of the bottle in securing the closure thereto, a cushion disk within and engaging the top of said shell, and a laminated facing disk of smaller diameter than said cushion disk, and permanently bonded thereto, said facing disc including therein an outer lamina composed of a fibrous material having a surface coating of a material chemically resistant to the contents of a container, an inner lamina of a metal foil, and a bonding stratum between said lamina. The invention also consists in such other novel characteristics as are hereinafter set forth and described, and more particularly pointed out in the claims hereto appended.

Referring to the drawing,

Fig. 1 is a vertical section through the top of the neck of the container and a closure embodying the invention applied thereto;

Fig. 2 is a bottom view of the closure shown in Fig. 1 with the facing disk broken away upon different planes; and Fig. 3 is a section through a cushion disk and its facing disk apart from the closure.

Like numerals refer to like parts throughout the several views.

In the accompanying drawing, the invention is shown attached to a portion 10 of the neck of the bottle, having adjacent its top a bead 11 constituting means by which a closure may be attached to the bottle or other container.

The closure proper comprises a metal shell 5 having a top 12 and a fluted skirt 13, the flutes of which are adapted to be contracted in a well known manner to interlock the flutes with the bead 11. Within the metal shell and adjacent the top 12 thereof is a sealing gasket or cushion disk 14 which may be made of natural cork, composition cork or any desired material having sufficient compressibility and resiliency to form a liquid and gas tight joint about the top of the neck 10 of the bottle. This sealing gasket or cushion disk is ordinarily cemented to the top 12 of the metal shell to avoid displacement of the gasket during transportation of the closures in bulk or their agitation in the hopper of a filling and capping machine.

Protecting the cushion disk 14 is a facing disk, the center of which coincides with the center of the cushion disk. This facing disk is of smaller diameter than the cushion disk, a practice common with so-called center spot caps, but has a sufficiently large diameter to extend beyond the mouth and engage the top of the neck of the bottle, so as to effectively cover all portions of the disk 14 exposed within the mouth of the bottle.

The construction heretofore described is old and well known in the bottling art, my invention relating more particularly to a combination of parts wherein the facing disk has characteristics inherent therein which will increase the efficiency of the closure as a whole.

The facing disk, as shown in the drawings, is a laminated structure. The outer lamina 15, or that exposed to the contents of the bottle, is chemically resistant to said contents whether they be mildly acid or strongly alkaline. In the embodiment of the invention shown, this lamina consists of thin paper or other fibrous material having a thin surface coating of gilsonite or other material having the desired chemical resistant properties. This surface coating is shown at 16. The inner lamina 17 which is bonded by an adhesive stratum 18 to the cushion disk 14 is ordinarily a metal foil, which, while non-resistant to acids or alkalines forming a constituent of the contents of the bottle, is nevertheless impermeable to carbonic acid gas or other gases or vapors with which the contents are charged.

The outer lamina 15 is bonded to the inner lamina 17 by means of a thin stratum 19 of adhesive, the purpose of which is merely to combine the laminae into a unitary structure.

While, as heretofore stated, the lamina 15 may be somewhat porous in spots or have minute voids therein of sufficient magnitude to permit the passage of gas or vapors therethrough, the escape of such gas or vapors is not permitted because of the impermeability of the lamina 17.

By using a facing disk of the characteristics above referred to, the escape of liquid or gaseous constituents of the contents of a container, is not only prevented by deterioration of the material of the cushion disk 14 and the imparting to the contents of the bottle of a taint or characteristic flavoring of the material of said disk, is prevented. Furthermore, bacteriological action of the contents of the container upon the cushion disk 14 is prevented as a result of the complete isolation of this disk from the container contents due to the interposition of the laminated facing disk between said cushion disk and the inside of the container.

The lamina 15 with its surface coating 16 may be somewhat thinner than the varnished paper disks used prior to my invention, and the laminated disk as a whole may be more flexible than such paper disks. While the lamina 17 may be of substantially the same thickness as the metal used generally in facing disks, it may also be made of much thinner foil.

The disks, by reason of their laminated structure, possess little or no springiness and remain in any position in which they may be formed. Hence, in applying the closure embodying the invention to a bottle or other container, the facing disk readily conforms to the portion of the neck of the bottle with which it contacts and to the material of the cushion disk as it is compressed to form the seal about the neck of the bottle.

When a closure embodying the invention is applied to a bottle or other container, the outer lamina resists disintegration thereof, as a result of chemical action thereon by the contents of a container. As a result, there is no discoloration of, or deterioration in, the material of the facing disk. If a metal foil other than tin be used for the inner lamina, the cap could not be used in the packaging of certain beverages containing fruit acids and alkalis, or acids used in the production or synthetic flavoring extracts. The use of metal foil disks, however, is desirable, because of the ductility of the material thereof and because such foils are impermeable to gases arising from the contents of a bottle or other container.

In a closure embodying the invention, having therein a laminated facing disk of the character described, I am enabled to prevent the escape of the gases and vapors from the bottle and prevent deterioration of the cushion disk 14 from the action of such gases and vapors thereon.

While I have employed express or kraft paper as a carrier for the chemically resistant material, this is not essential. Various well known adhesives or cements may be used in combining the two laminae and in attaching the laminated facing disk to the cushion disk 14. Cements, such as those containing albumen, casein, different resins and gums, gutta-percha tissue and cellulose cements are readily obtainable upon the open market and may be alternatively used, according to the manufacturing methods employed in producing the laminated material or in assembling closures embodying the invention. The adhesives used in the stratum 19 may be selected solely with regard to their adhesive properties, since the superimposed disks, having dissimilar properties as described, form an effective barrier against the escape of liquid, gas or vapor from a bottle or other container. It is necessary, however, to combine such laminae in a unitary structure because of the manufacturing methods employed in producing the closure and in applying such closures by machine to bottles or other containers.

It is not my intention, therefore, to limit the invention to the precise details of construction, or to the particular materials herein disclosed, it being obvious that other materials having the same characteristics may be employed without departing from the spirit and scope of the invention.

Having described the invention, what I claim as new and desire to have protected by Letters Patent, is:—

1. A bottle closure embodying therein a shell having a skirt so formed as to co-operate with means upon the neck of the bottle in securing the closure thereto, a cushion disk within and engaging the top of said shell, and a laminated facing disk of smaller diameter than said cushion disk, and permanently bonded thereto, said facing disk including therein an outer lamina composed of a fibrous material having a surface coating of a material chemically resistant to the contents of a container, an inner lamina of a metal foil, and a bonding stratum between said laminae.

2. A bottle closure embodying therein a shell having a skirt so formed as to co-operate with means upon the neck of the bottle in securing the closure thereto, a cushion disk within and engaging the top of said shell, and a laminated facing disk of smaller diameter than said cushion disk, and permanently bonded thereto, said facing disk including therein an outer lamina composed of a fibrous carrier having an outer surface of gilsonite, an inner lamina of a metal foil, and a bonding stratum between said laminae.

JAY BERNARD EISEN.